(12) United States Patent
Farhangi et al.

(10) Patent No.: US 10,986,065 B1
(45) Date of Patent: Apr. 20, 2021

(54) CELL-BASED DISTRIBUTED SERVICE ARCHITECTURE WITH DYNAMIC CELL ASSIGNMENT

(71) Applicant: Amazon Technologies, Inc., Seattle, WA (US)

(72) Inventors: Alireza Farhangi, Seattle, WA (US); Mykhailo Delegan, Vancouver (CA); Yifei Zhuang, Burnaby (CA); Gurkaran Singh Poonia, Surrey (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/430,206

(22) Filed: Jun. 3, 2019

(51) Int. Cl.
*H04L 29/12* (2006.01)
*H04L 29/08* (2006.01)

(52) U.S. Cl.
CPC .......... *H04L 61/10* (2013.01); *H04L 61/1511* (2013.01); *H04L 61/2007* (2013.01); *H04L 61/6009* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,298,760 B1 * | 3/2016 | Li ........................ | G06F 16/2228 |
| 10,530,845 B1 * | 1/2020 | Golden ................... | H04L 47/70 |
| 2016/0112523 A1 * | 4/2016 | Bagasra .................. | H04L 67/22 |
| | | | 709/217 |

* cited by examiner

*Primary Examiner* — Jeffrey R Swearingen
(74) *Attorney, Agent, or Firm* — Knobbe, Martens, Olson & Bear, LLP

(57) ABSTRACT

Systems and methods are described for dynamically assigning data sets to cells within a cell-based architecture, in which individual cells individual cells operate independently of one another within the cell-based architecture. In response to a request to create a data set on the cell-based architecture, a system can dynamically assign the data set to a cell based on cell information, which can reflect cell health, utilization, configuration, and the like. The system can create a record that associates the data set to the selected cell, such that subsequent requests to access the data set can be routed to the selected cell based on the record. Dynamic assignment of data sets to cells improves on fixed assignment techniques, for example, by enabling heterogeneous cell configuration.

20 Claims, 6 Drawing Sheets

CELL-BASED DISTRIBUTED SERVICE ARCHITECTURE WITH DYNAMIC CELL ASSIGNMENT

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

Virtualization technologies and data centers enable a variety of new techniques for providing network-based services. One such technique is "micro-services," in which desired functionality is not simply housed within a single device providing a service, but distributed among a variety of smaller, fine-grained services (each a "micro-service"). Micro-services may be independently developed, maintained, managed, and scaled, providing higher flexibility and resiliency to "macro-services" built using the micro-services.

One issue that arises in network-based services, and particularly for micro-services, is that of service discovery. The term service discovery generally refers to mechanisms for locating a service on a network, such as by locating an identifier of a computing device providing a service. A variety of traditional mechanisms for network discovery exist. For example, early network devices hard-coded identifiers into a local file (a "HOSTS.TXT" file), which was manually updated as new devices were added to the network. Later, the Domain Name System (DNS) was introduced as an automated, hierarchical mechanism for resolving identifiers into network addresses. While these discovery mechanisms are possible to use with micro-services, they are often insufficient. For example, DNS often suffers from "tail-latency," meaning that changes to network address information records can require large amounts of time to propagate through the system. Moreover, many DNS implementations are limited in the type of data that can be provided, often requiring resolution into an Internet Protocol (IP) address (or mapping to a domain name with a valid DNS record that itself resolves to an IP address). These problems limit the suitability of DNS as a stand-alone solution for service discovery, particularly in a micro-services context.

DETAILED DESCRIPTION

Figure 1:
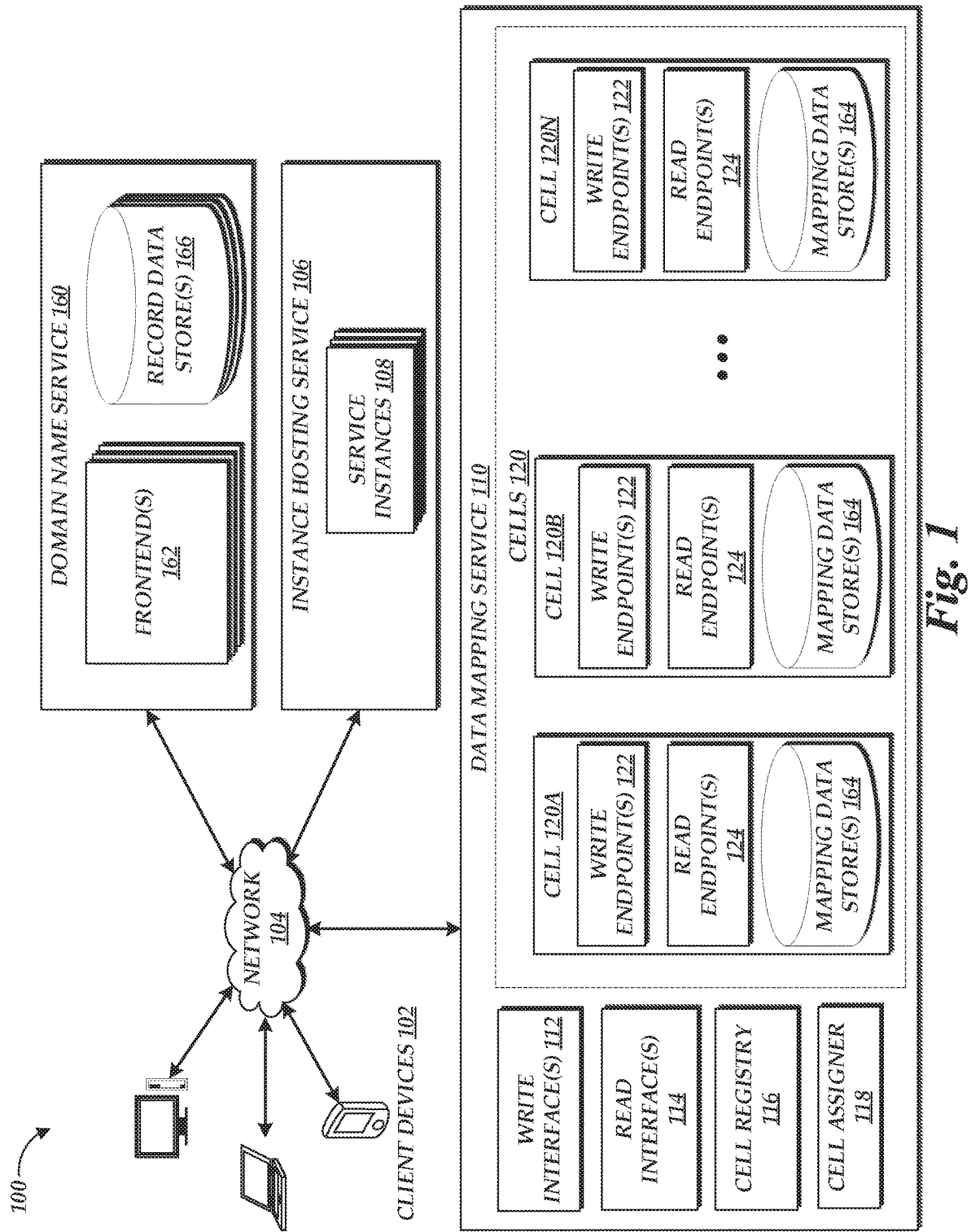
FIG. 1 is a block diagram depicting an illustrative environment in which a data mapping service can utilize dynamic cell assignment within a cell-based architecture to assign cells to store data sets.

Generally described, aspects of the present disclosure relate to a cell-based distributed service architecture with dynamic cell-assignment. More particularly, the aspects of the present disclosure relate to implementation of a cell-based data mapping service, in which particular subsets of data are handled by independent cells, and in which the mapping of subsets to cells is dynamically adjustable (potentially on a per-subset basis).

In one embodiment, the data mapping service provides a service discovery mechanism, enabling service identifiers, such as uniform resource identifiers (URIs), to be mapped to identifiers of instances providing the service (such as IP addresses of virtualized computing devices). As discussed herein, the data mapping service can utilize a cell-based architecture, in which responsibility for storing mapping information is distributed among a number of cells. Each cell may be largely or completely independent, such that a failure of one cell does not or is unlikely to affect operation of another cell (limiting the "blast radius" of a failure). The subset of data handled by each cell may generally be referred to as a "shard" of the overall data handled by the data mapping service. In the context of a service discovery mechanism, each shard may correspond to a particular "namespace," such as a subdomain of the given domain in DNS.

Because responsibility for namespaces is divided among cells, a mechanism is needed to determine which cell is responsible for maintaining data related to each namespace. One possible mechanism for doing so is to utilize a fixed mapping, such as a "hash ring." For example, a device attempting to determine which cell stores data for a namespace may apply a hash algorithm to a particular value (a "partition key," such as an identifier of the namespace) and determines the cell based on a division of values among cells. While this strategy is relatively straightforward, it is also relatively fixed, in that cell assignments are not typically alterable on a per-namespace basis (without a complete replacement of the fixed mapping algorithm). In addition, this strategy generally requires homogenous cell configuration, operating under an assumption that each cell is capable of servicing each namespace.

This disclosure provides an alternative mechanism for assigning cells to namespaces (or other data shards), by providing a dynamic assignment system that can alter cell assignments on a per-namespace basis. Specifically, as disclosed herein, a data mapping service can operate to receive requests to create namespaces on a data mapping service, and to select a particular cell to assign to that namespace based on information regarding the cells, such as load information or operating characteristics, as well as information included within the request, such as desired cell characteristics. The service can then create a record relating the namespace and the cell assigned to store mapping information for the namespace. In one embodiment, the records are DNS records. Thus, when a request to write or read data of a namespace on the data mapping service is received, the service may determine a cell associated with the namespace by referencing the record, and directing the request to the cell identified in the record. Because cell assignments are identified in records, rather than through a fixed algorithm, the assignments can be varied on a per-namespace basis. For example, changing the cell assigned to a namespace may simply require altering a record for the namespace (and potentially migrating existing data for the namespace between cells).

In contrast to alternative mechanisms, such as hash rings, using records to associate cells to namespaces may simplify identification of cells at the time of requests to interact with the data mapping service. For example, a read or write interface may simply reference a DNS record mapping a namespace to a particular cell, as opposed to maintaining a hash ring to identify the cell. While this technique may increase the complexity of creating an initial record mapping an assignment to a cell (which initial record may not even be required in fixed mapping systems), this increase in complexity can lead to numerous benefits. For example, because assignments are dynamic and independently modifiable, the service need not rely on a single partition key to distribute namespaces among cells, but may vary its distribution to reflect operation of the service. As an illustration, consider an instance where namespaces are evenly distributed among cells, but an owner of a single namespace (e.g., a high volume namespace) requests a dedicated cell. Such a request may be impossible to fulfill under a fixed mapping, but is possible under the embodiments disclosed herein. Similarly, consider an instance where different namespaces are associated with different operational requirements, such as where some namespaces can accept an "eventually consistent" consistency model (to gain operational performance associated with eventually consistent data storage), while others require a "strongly consistent" consistency model (and are willing to accept the performance constraints of such storage). A cell-based architecture using a fixed mapping would generally be unable to comply with those requirements, since cells in such a system are often required to be homogenous. In contrast, embodiments of the present disclosure may utilize heterogeneous cells, mapping namespaces to cells that provide their desired configuration. Thus, users desiring strongly consistent data storage may be assigned to cells configured to provide strongly consistent storage, users desiring eventually consistent data storage may be assigned to cells configured to provide eventually consistent storage, etc.

As will be appreciated by one of skill in the art in light of the present disclosure, the embodiments disclosed herein improves the ability of computing systems, such as network services, to efficiently distribute data among cells within a cell-based architecture. Specifically, embodiments of the present disclosure increase the flexibility with which shards of data may be distributed among cells, enabling the use of heterogeneous cell configurations and dynamic migration of shards among cells. In the context of a data mapping service, embodiments of the present disclosure enable more efficient distribution of namespaces among cells, providing improvements to service discovery for network-based services. Moreover, the presently disclosed embodiments address technical problems inherent within computing systems; specifically, limited nature of resources available to individual computing devices and the difficulties in distributing computational load among devices in a flexible way. These technical problems are addressed by the various technical solutions described herein, including the dynamic assignment of shards to cells and the use of records noting those dynamic assignments, such that requests to access a cell can be routed without a fixed mapping algorithm. Thus, the present disclosure represents an improvement on existing cell-based architectures and computing systems in general.

While embodiments of the present disclosure are discussed with respect to specific uses of a cell-based architecture, such as the partitioning of namespaces among cells within a data mapping service (e.g., facilitating service discovery), aspects of the present disclosure may be utilized to provide dynamic mapping of shards to cells in a variety of other contexts. Thus, namespaces should be understood in the present disclosure to represent an example shard that may be distributed across cells, and a data mapping service should be understood to represent an example system utilizing a cell-based architecture.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which a data mapping service 110, instance hosting service 106, and domain name service 160 may operate based on communication with client devices 102. By way of illustration, various example client devices 102 are shown in communication with the data mapping service 110, instance hosting service 106, and domain name service 160, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The data mapping service 110, instance hosting service 106, and domain name service 160 may provide the client devices 102 with one or more user interfaces, command-line interfaces (CLIs), application programing interfaces (APIs), and/or other programmatic interfaces for utilizing the respective services. For example, the data mapping service 110 may provide interfaces for creating and configuring namespaces associated with mapping data on the data mapping service 110, the instance hosting service 106 may provide interfaces for creating and configuring service instances 108, and the domain name service 160 may provide interfaces for creating and configuring DNS records. Although one or more embodiments may be described herein as using a user interface, it should be appreciated that such embodiments may, additionally or alternatively, use any CLIs, APIs, or other programmatic interfaces. Moreover, while end users may operate client devices 102, client devices 102 may also include non-end-user devices, such as servers, or other devices that access respective services provided by the data mapping service 110, instance hosting service 106, and domain name service 160.

The client devices 102, data mapping service 110, instance hosting service 106, and domain name service 160 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The instance hosting service 106 represents a service configured to enable client devices 102 to request, obtain, configure, and manage service instances 108, each of which represents a computing device (or portion of a computing device) configured to provide a service on behalf of a client. Each service instance 108 may, for example, represent a physical computing device, a virtual computing device, a software container within a computing device, or a thread executing on a computing device. Each service instance 108 may provide a network-accessible service, such as a database service, web hosting service, video transcoding service, or any of a wide variety of known network-accessible services. In one embodiment, a service instance 108 provides a micro-service on behalf of a client. The instance hosting service 106 can provide a variety of interfaces through which client devices 102 may configure service instances 108. For example, the instance hosting service 108 may enable a client device 102 to specify a hardware configuration of each of their service instances 108 (e.g., processing power, memory, etc.) and a software configuration (e.g., an operating system, applications, etc., which may illustratively be provided in the form of a device image provisioned to a disk drive accessible to an instance 108). The service 106 may further enable a client device 102 to specify how instances 108 should be created, destroyed, or maintained. For example, a client device 102 may specify that an instance should be created or destroyed at certain times or according to certain conditions specified by a client 102. A variety of instance hosting services 106 are known in the art and thus the details of operation of the service 106 will not be discussed herein.

In one embodiment, multiple instances 108 operate collectively to provide a distributed network-accessible service on behalf of a client, and the hosting service 106 is configured to programmatically scale the service by increasing or decreasing the number of instances 108 providing the service according to a defined metric (e.g., load on the service). After such scaling, a mechanism may be needed to redistribute traffic of the service among the new number of instances 108. One mechanism for doing so would be to employ a load-balancing proxy, which acts as an access point for instances 108 and routes traffic among the instances 108. However, using such a load balancer may be undesirable, as the load balancer can act as a "point of failure" for the system. Moreover, the load balancer may operate inefficiently if not in close proximity to each instance 108 (e.g., in terms of network distance), and locating the load balancer may be difficult where instances 108 are distributed (e.g., among a wide geographic area).

In the instance that a fixed access point for instances 108 is not provided (e.g., a fixed load balancer), a mechanism may be required for client devices 102 to discovery instances 108 providing the service, such that they can access the service through those instances 108. Such a mechanism is generally referred to herein as a "service discovery" mechanism. One possible service discovery mechanism is the widely established Domain Name System ("DNS"), which provides a mechanism for resolving a domain name into an IP address. The domain name service 160 is an example of a service providing DNS functionality. Specifically, the domain name service 160 includes a number of frontends 162 that act as DNS servers, responding to requests to resolve a domain name by identifying a DNS record for the domain name and returning an IP address within that DNS record. The DNS records may be stored, for example, in the record data stores 166, which correspond to a non-transitory data store, such as one or more hard disk drives (HDDs), solid state drives (SSDs), tape drives, random access memories (RAM), read only memory (ROM), etc. General operation of a service providing DNS resolution is known in the art, and thus will not be described in detail. However, in the context of the present disclosure, a client device 102 may configure a DNS service, such as the domain name service 160, to enable service discovery for a service. For example, the client device 102 may provide IP addresses of each instance 108 of a service to the domain name service 106, such that the service 160 resolves a domain name associated with a service (e.g., "service.example.tld") into IP addresses of the instances 108. In some configurations, the instance hosting service 106 may notify the domain name service 160 when instances 108 are added or removed from a pool of instances 108 providing the service, such that DNS records for the service are automatically updated at the domain name service 160. In this way, client devices 102 may utilize a domain name of the service to discovery the instances 108 providing the service, thus providing service discovery.

The use of DNS to provide service discovery has significant drawbacks, however. Public DNS systems today are typically distributed and operated by numerous entities. As such, propagation of changes to DNS records can take relatively long amounts of time (e.g., minutes, tens of minutes, hours, etc.). During this period, because client devices 102 may not be able to correctly discover instances 108 providing a service, load may be unevenly distributed among instances 108, or client devices 102 may encounter errors when trying to access an instance 108 included within DNS records but no longer available. In addition, DNS records are typically required to resolve to an IP address, which may not represent a desired identifier of instances 108. For example, the instance hosting service 106 may provide non-IP identifiers of instances 108 (such as according to a naming scheme specific to the hosting service 106), and thus DNS records might be unable to identify the instances 108. Still further, DNS systems are typically limited in their interfaces, requiring standardized protocols to retrieve records. These interfaces further limit the types of requests client devices 102 may make. For example, DNS systems may not provide client devices 102 with a way to specify criteria for appropriate instances 108 (such as a desired location of an instance 108, desired configuration, etc.). Rather, DNS systems generally return all instances 108 associated with a domain, or select a subset of such instances 108 based on logic pre-defined at the system as opposed to specified within a DNS request. Thus, DNS systems, such as the domain name service 160, may provide suboptimal service discovery.

To address these issues, the environment 100 further includes a data mapping service 110 configured to provide service discovery regarding instances 108 while addressing the shortcomings of other service discovery mechanisms. Specifically, the data mapping service 110 can provide service discovery by mapping identifiers of a service, such as domain names within a namespace (e.g., a sub-domain) to identifiers of instances 108 providing the service (e.g., IP addresses or other identifiers, including identifiers of a private identification scheme). The mapping service 110 illustratively provides more flexible interfaces than DNS systems, such as enabling client devices 102 to specify criteria for which identifiers of instances 108 are desired.

To provide scalability, the data mapping service 110 utilizes a cell-based architecture, providing a number of cells 120 each of which independently provide functionality of the service 110. Specifically, each cell 120 includes a write endpoint 122 enabling writing to data mapping a service identifier to instance identifiers, a read endpoint 124 enabling reading such a mapping data, and one or more mapping data stores 164 storing the mapping data. In one embodiment, the mapping data of each cell 120 is mutually exclusive, such that a subset of data exists in one and only one cell 120. In another embodiment, the mapping data of each cell 120 at least partially overlaps. For example, a first cell 120 may be assigned as a primary cell for a specific set of data (e.g., a namespace), while another cell 120 is assigned as a secondary cell for the data set. Functionalities of the endpoint 122, endpoint 124, and mapping data stores 164 of each cell 120 can be isolated from one another, such that a failure of a component within one cell 120 is unlikely or unable to effect operation of a different cell 120. While shown as distinct logical elements in FIG. 1, the endpoint 122, endpoint 124, and mapping data stores 164 of each cell 120 are in one embodiment implemented as virtualized devices on the instance hosting service 106.

Because mapping data of the service 110 is distributed among the cells 120, a mechanism may be required to partition the mappings among the cells 120. One potential mechanism is the use of a fixed mapping, whereby the cell 120 hosting a particular mapping data is identifiable by application of a fixed algorithm to an aspect of the data mapping (e.g., a service identifier, such as a domain name). As a simplified example, a cell 120A may be configured to store all mapping data for services beginning with the letter 'a', a cell 120B may be configured to store all mapping data for services beginning with the letter etc. More complex fixed mappings are also possible. For example, a "hash ring" may be used, where each cell is associated with a value from among a set of values, and a given mapping data is handled by the cell whose value is the smallest value greater than a hash of the domain name (or, if the hash of the domain is greater than all cell values, by the cell with the smallest value). A variety of fixed mappings are known in the art and thus will not be described in detail herein.

In general, fixed mappings may be advantageous in that no distinct assignment mechanism is required to assign mapping data to a cell 120. Rather, any device reading or writing to mapping data may apply the fixed algorithm to a designated partition key (e.g., the domain name) to identify the cell 120 responsible for holding the mapping data. However, a downside to a fixed algorithm is the inflexibility of cell assignments. For example, to modify which cell 120 hosts a particular mapping data, a change in the fixed algorithm may be required. Moreover, a fixed algorithm places certain constraints on the cells 120, such as a requirement that cells be homogenous (since the algorithm does not enable selective assignment to appropriate heterogeneous cells 120).

To address these shortcomings, the data mapping service 110 of FIG. 1 does not utilize a fixed mapping, but instead utilizes a distinct assignment mechanism whereby specific sets of mapping data (such as mapping data associated with a particular namespace) are assigned to specific cells 120. Specifically, the service 110 includes a cell assignor 118 configured to receive a request to create a set of mapping data (generally referred to herein as a namespace, which may correspond for example to a specific subdomain), and to select a cell 120 from among available cells 120 to which to assign that namespace. In contrast to fixed mappings, the cell assigner 118 can take into account factors such as cell utilization, allowing more effective load balancing among cells 120, as well as desired cell characteristics, allowing heterogeneous cells, among other benefits.

To facilitate operation of the cell assigner 118, the service 110 includes a cell registry 118 configured to maintain information regarding individual cells 120. The cell registry 118 may maintain, for example, load information for cells 120, such as the amount of computing resources used by or available to individual cells 120. Computing resource usage may be measured in a variety of metrics. For example, the cell registry 116 may monitor and record data storage used by or available to each cell 120 (e.g., in terms of bytes), volume of reads/writes handled by the cell 120 (e.g., in terms of bytes read/written, requests per second, bandwidth used, etc.), processing power used by a cell 120, etc. In some instances, a single derived metric may be used, combining one or more individual metrics into a single combined value (e.g., a "health score" for the cell 120). Illustratively, each cell 120 may periodically report individual or combined metrics to the cell registry 116. As will be discussed in more detail below, when assigning a namespace to a cell 120, the assigner 118 may retrieve cell metrics information from the registry 116 and select assign a namespace to a cell 120 based at least partly on cell metrics.

In addition to the component discussed above, the data mapping service 110 includes one or more write interfaces 112 and read interfaces 114 that facilitate interaction with the cells 120. In one embodiment, the write interfaces 112 and read interfaces 114 are configured to obtain a request to read from or write to mapping data, identify a cell associated with the mapping data, and route the request to an endpoint (e.g., a write endpoint 122 or read endpoint 124, respectively) for processing. In this manner, write interfaces 112 and read interfaces 114 may act as proxies for respective endpoints within cells 120. While a configuration of a service 110 including write interfaces 112 and read interfaces 114 external to cells 120 is shown in FIG. 1, other configurations are possible. For example, in one embodiment, the service 110 may utilize a peer-to-peer configuration, in which endpoints 122 and 124 within cells 120 act as peers to one another, each configured to receive requests to read from or write to mapping data, and to route to an endpoint of a different cell 120, if necessary.

In order for the write interfaces 112 and read interfaces 114 to identify an appropriate cell 120 to which to route a request, the service 110 illustratively uses records mapping namespaces (under which mapping data is organized) to individual cells 120. In one embodiment, these records are stored by the domain name service 160 as DNS records. For example, when the cell assigner 118 selects a cell 120 to assign to a namespace, the cell assigner 118 can interact with the domain name service 160 to create an ALIAS or CNAME that associates an identifier of the namespace to an identifier of a cell 120 assigned to that namespace. In some embodiments, separate records may be created for reads and writes. For example, a first record may associate a "read" URI for a namespace (e.g., "read.example.tld") to an identifier of a read endpoint 124 (e.g., "read.cell-120a.datamappingservice.tld"), and a second record may associate a "write" URI for a namespace to an identifier of a write endpoint 122. Records may similarly exist mapping identifiers of cell endpoints to IP addresses of those endpoints. Thus, write interfaces 112 and read interfaces 114 may, on receiving a request to read from or write to mapping data, may utilize the record to resolve an identifier of the namespace into an identifier of a cell assigned to maintain mapping data for that namespace.

Notably, while embodiments of the data mapping service 110 may utilize DNS, this does not imply that the limitations of DNS discussed above are incurred. For example, while DNS is noted above as sometimes incurring tail latency inappropriate for rapidly scalable services, the use of the domain name service 160 by the data mapping service 110 may be limited to mapping namespaces to cells—a mapping that may be expected to change infrequently. Thus, this use of the service 160 does not have a detrimental effect on changes to mapping data, which may occur rapidly without reliance on the domain name service 160. Similarly, the use of the domain name service 160 by the data mapping service 110 to assist in mapping of namespaces to cells does not limit the type of data storable within the mapping data stores 164. Rather, those stores 164 may operate to store arbitrary key-value pairs, mapping a variety of namespaces formats to any number of instance identifiers. Still further, the use of the domain name service 160 by the data mapping service 110 to assist in mapping of namespaces to cells does not limit the ability of the service 110 to provide APIs or other advanced interfaces, enabling selective return of instance identifiers based on parameters of the request (e.g., to select a nearby instance 108, a least loaded instance 108, etc.). Thus, while the service 110 may utilize DNS techniques in some regards, it also improves on using solely DNS to provide service discovery.

In addition, while DNS (e.g., via the domain name service 160) is contemplated as a mechanism for storing records associating namespaces to cell identifiers, other mechanisms are possible. In general, any service providing storage of key-value pair may be used. For example, the service 110 may utilize or include a database associating namespaces to cell identifiers. In one embodiment, the data mapping service 110 may operate recursively, storing associations of namespaces to cell identifiers within a cell 120. To avoid endless recursion, the cell 120 used to store such associations may be pre-determined, such as by using a fixed mapping to identify that particular cell 120 (e.g., while using records to control other data-to-cell associations). The particular record storage mechanism used in an embodiment may be selected according to desired characteristics of the storage mechanism, such as availability, speed, consistency, and the like. For example, DNS may provide high availability but low propagation speed. A distributed, eventually consistent data store may provide high speed but lower consistency. A strongly consistent data store may provide high consistency, but low speed, etc. Thus, a variety of techniques may be used to store associations between namespaces and cell identifiers.

Each of the write interfaces 112, read interfaces 114, cell registry 116, and cell assigner 118 may be implemented on an appropriate computing device within a network environment. While shown distinctly, these components may be co-housed in a single computing device. In some embodiments, these components may be implemented by a service instance 108 in the instance hosting service 106.

The domain name service 160, instance hosting service 106, and data mapping service 110 are each depicted in FIG. 1 as operating in a distributed computing environment including several computer systems that are interconnected using one or more computer networks (not shown in FIG. 1). Each of the domain name service 160, instance hosting service 106, and data mapping service 110 could also operate within a computing environment having a fewer or greater number of devices than are illustrated in FIG. 1. Thus, the depiction of the domain name service 160, instance hosting service 106, and data mapping service 110 in FIG. 1 should be taken as illustrative and not limiting to the present disclosure. For example, the data mapping service 110 or various constituents thereof could implement various Web services components, hosted or "cloud" computing environments, and/or peer to peer network configurations to implement at least a portion of the processes described herein. In some instances, two or more of the domain name service 160, instance hosting service 106, and data mapping service 110 may be combined into a single service.

Further, each of the domain name service 160, instance hosting service 106, and data mapping service 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

While some functionalities are generally described herein with reference to an individual component of the data mapping system 110, other components or a combination of components may additionally or alternatively implement such functionalities. For example, as noted above, while the data mapping system 110 is depicted in FIG. 1 as including write interfaces 112 and read interfaces 114 external to cells 120, these interfaces may in some instances be omitted and functionality of the interfaces may be implemented directly by endpoints within the cells 120. Thus, the specific configuration of elements within FIG. 1 is intended to be illustrative.

Figure 2:
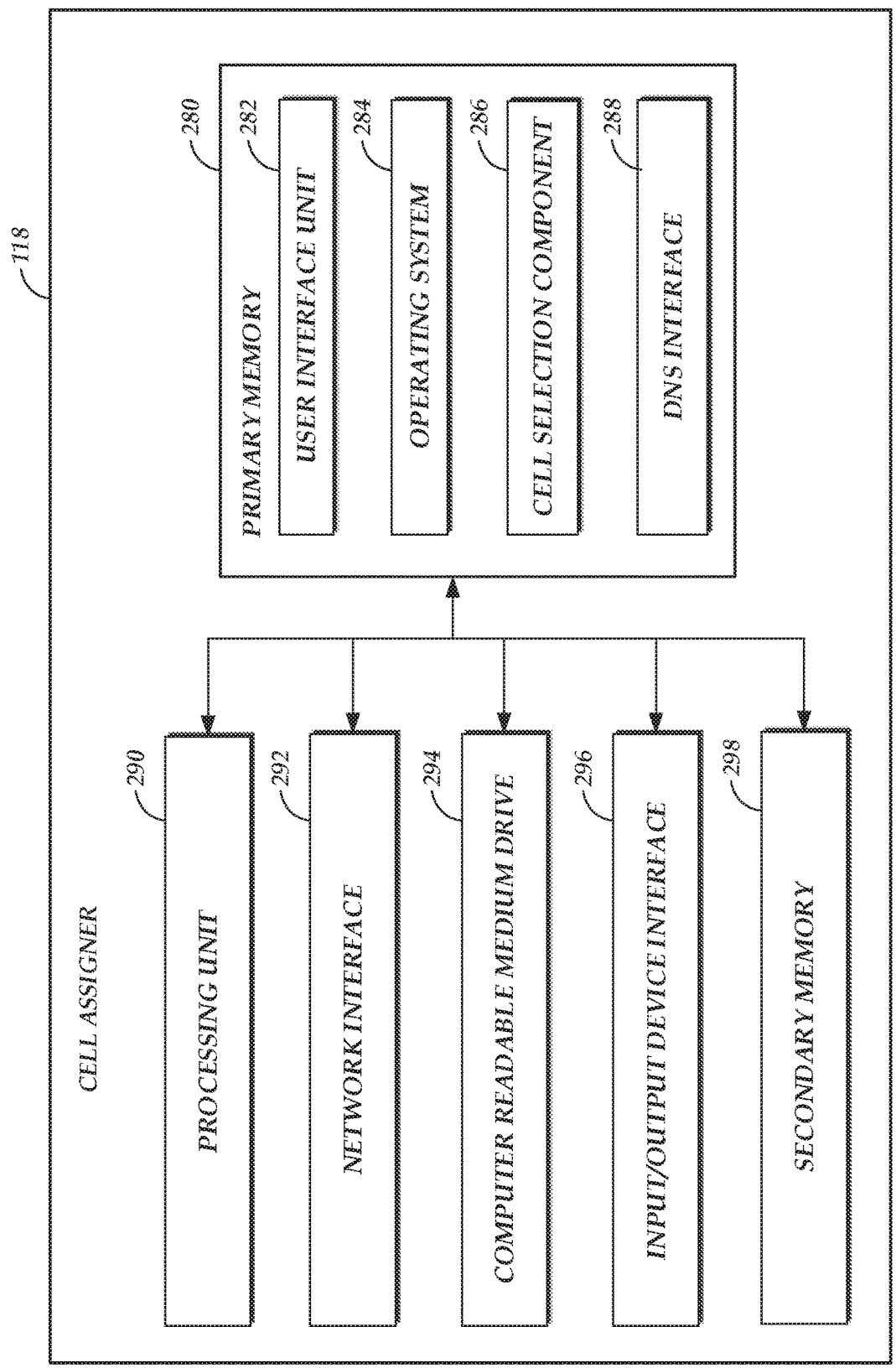
FIG. 2 depicts a general architecture of a computing device providing a cell assigner of the data mapping service of FIG. 1, which may function to dynamically assign cells of a cell-based architecture to store a data set.

FIG. 2 depicts a general architecture of a computing system implementing a cell assigner 118 of FIG. 1. The general architecture of the cell assigner 118 depicted in FIG. 2 includes an arrangement of computer hardware and software that may be used to implement aspects of the present disclosure. The hardware may be implemented on physical electronic devices, as discussed in greater detail below. The cell assigner 118 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1.

As illustrated, the cell assigner 118 includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from primary memory 280 and/or secondary memory 298 and further provide output information for an optional display (not shown) via the input/output device interface 296. The input/output device interface 296 may also accept input from an optional input device (not shown).

The primary memory 280 and/or secondary memory 298 may contain computer program instructions (grouped as units in some embodiments) that the processing unit 290 executes in order to implement one or more aspects of the present disclosure. These program instructions are shown in FIG. 2 as included within the primary memory 280, but may additionally or alternatively be stored within secondary memory 298. The primary memory 280 and secondary memory 298 correspond to one or more tiers of memory devices, including (but not limited to) RAM, 3D XPOINT memory, flash memory, magnetic storage, and the like. The primary memory 280 is assumed for the purposes of description to represent a main working memory of the cell assigner 118, with a higher speed but lower total capacity than secondary memory 298.

The primary memory 280 may store an operating system 284 that provides computer program instructions for use by the processing unit 290 in the general administration and operation of the cell assigner 118. The memory 280 may further include computer program instructions and other information for implementing aspects of the present disclosure. For example, in one embodiment, the memory 280 includes a user interface unit 282 that generates user interfaces (and/or instructions therefor) for display upon a computing device, e.g., via a navigation and/or browsing interface such as a browser or application installed on the computing device.

In addition to and/or in combination with the user interface unit 282, the memory 280 may include a cell selection component 286 executable to select a cell 120 to assign to store mapping data for a namespace, in accordance with aspects of the present disclosure. The memory 280 may further include a DNS interface 288 executable to interact with the domain name system 160 to store records recording the assignment of a cell 120 to a namespace.

The cell assigner 118 of FIG. 2 is one illustrative configuration of such a device, of which others are possible. For example, while shown as a single device, a cell assigner 118 may in some embodiments be implemented as multiple physical host devices. In other embodiments, the cell assigner 118 may be implemented as a virtual device executing on a physical computing device. While described in FIG. 2 as a cell assigner 118, similar components may be utilized in some embodiments to implement other devices shown in the environment 100 of FIG. 1.

Figure 3:
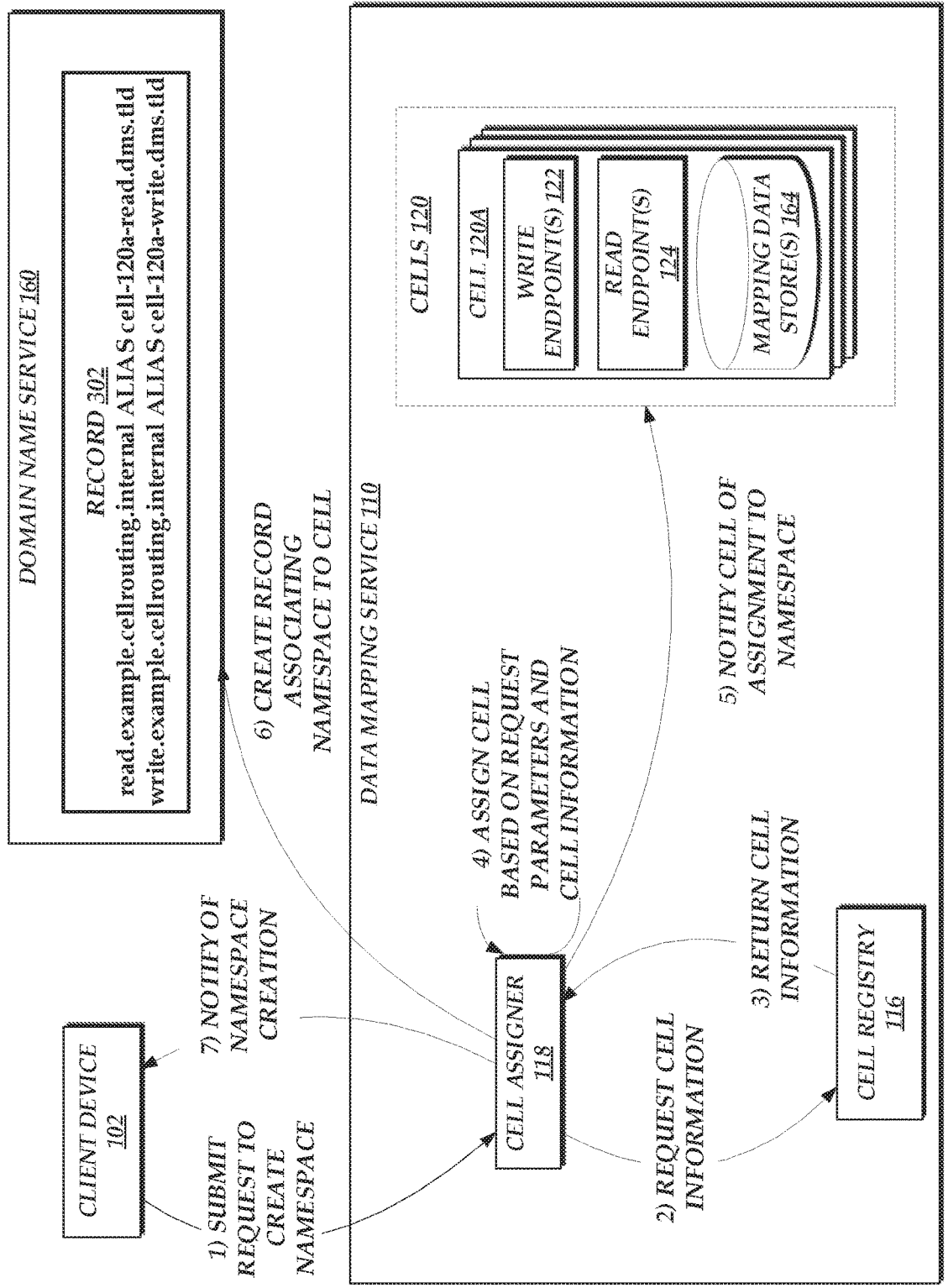
FIG. 3 is a flow diagram depicting illustrative interactions for handling a request to create a data set on the data mapping service of FIG. 1, utilizing dynamic cell assignment.

With reference to FIG. 3, illustrative interactions are depicted for providing dynamic assignment of a namespace to a cell 120 within the data mapping service 110. Specifically, at (1), a client device 102 submits to the data mapping service 110 (e.g., via an API provided by the service 110) a request to create a namespace on the service 110. A namespace can correspond to any collection of identifiers on the service 110, such as a subdomain controlled by a client of the device 102. As shown in FIG. 3, the request is received by the cell assigner 118, which is configured to select a cell 120 to assign to the namespace in accordance with the interactions of FIG. 3.

To facilitate assignment of a cell 120 to the namespace, the cell assigner 118, at (2), requests cell information from the cell registry 116. As noted above, the registry 116 can be configured to maintain information regarding the cells 120. For example, the registry 116 may maintain health information of the cells 120 (e.g., whether they are functioning correctly), load information on the cells 120 (e.g., metrics of utilization), or configuration information of the cells 120 (e.g., the specific attributes of the cell 120, such as differences from other cells 120 in a configuration of heterogeneous cells 120). The cell information is then returned from the registry 116 to the assigner 118 at (3).

At (4), the cell assigner 118 selects a cell 120 based on the request, the cell information, or a combination therefore. In one embodiment, the cell assigner 118 may select a random cell 120 from among all healthy cells 120 identified in the cell information. In another embodiment, the cell assigner 118 may select a least utilized cell 120 from among health cells 120. In some embodiments, the cell assigner 118 may apply filters or weighting criteria to the cell selection, such as by filtering or weighting cells 120 based on network distance to a client device 102. For example, where cells 120 are geographically distributed, the assigner 118 may select a cell 120 proximate to the client device 102 in terms of network distance. In another embodiment, the cell assigner 118 may filter based on cell configuration, based for example on a configuration requested by the client device 102. Illustratively, where cells 120 provide one of eventual or strong consistency for mapping data and the request from the client device 102 specifies a type of consistency, the cell assigner 118 may select from among healthy cells 120 a cell 120 that provides the specified consistency type. While selection is noted in FIG. 3 as a function of the cell assigner 118, all or a portion of cell selection may additionally or alternatively be implemented at the cell registry 116. For example, the cell registry 116 may be configured to return information on only health cells 120, or only a portion of cell 120 meeting threshold criteria (e.g., under a certain load, with an appropriate configuration, etc.).

After assigning a cell 120 to the namespace, the cell assigner 118, at (5), notifies the selected cell 120 (e.g., cell 120A) of the assignment. Illustratively, notification of an assignment may facilitate routing of requests to cells 120, such that the cell 120A is aware, on receiving a request to read from or write to a namespace, that it is the assigned cell 120 for the namespace. As an example, in the instance that a cell 120 receives a request to read from or write to a namespace to which it is not assigned, the cell 120 may route the request to an alternative location (e.g., to an endpoint of an appropriate cell 120, to the write interface 112 or read interface 114, etc.).

In addition, at (6), the cell assigner 118 creates a record on the domain name service 160 associating the namespace and cell. An illustrative record is shown in FIG. 3 as record 302. While shown as a single record 302, one or more records may be created. In one embodiment, a single record maps a namespace identifier to a cell identifier. In another embodiment, one or more records map a read identifier for the namespace (e.g., "read.example.cellrouting.internal") to an identifier for a read endpoint 124 (e.g., "cell-120a-read.dms.tld"), and also map a write identifier for the namespace (e.g., "write.example.cellrouting.internal") to an identifier for a write endpoint 122 (e.g., "cell-120a-write.dms.tld"). Illustratively, division of read and write identifiers may facilitate separate scaling of read and write endpoints 122/124, such as by adding additional records to the service 160 associating the read identifier of the namespace to additional read endpoints 124 of the cell 120A.

At (7), the cell assigner notifies the client device 102 of successful namespace creation, indicating that the client device 102 (or other devices) may read from and write to mapping data for the namespace. In one embodiment, the cell assigner 118 may delay interaction (7) until creation and propagation of the record 302 is complete at the service 160. For example, because DNS records may require some nontrivial amount of time to propagate through the service 160, the cell assigner 118 may, as part of interaction (6), periodically query DNS servers of the service 160 to verify existence of the record 302, and may delay interaction (7) until verification occurs. Notably, in one embodiment, verification need only occur when creating a namespace on a cell 120 or migrating a namespace to a new cell 120. As such, DNS propagation delays may be expected to have minimal impact on operation of the service 110.

Thus, by the interactions of FIG. 3, a namespace may be assigned to a cell 120 in a dynamic manner. While the interactions of FIG. 3 relate to creation of a namespace (via assignment of the namespace to a cell 120), similar interactions may be utilized to remove a namespace from the data mapping service 110. For example, a client device 102 may submit to the cell assigner 118 a request to delete a namespace, and the cell assigner 118 may in turn delete a record corresponding to the namespace from the domain name service 160 and notify a previously-assigned cell (e.g., identified from the record) that data for the namespace is no longer required or should be deleted. In this manner, the cell assigner 118 may facilitate creation and deletion of namespaces on the data mapping service 110.

Figure 4:
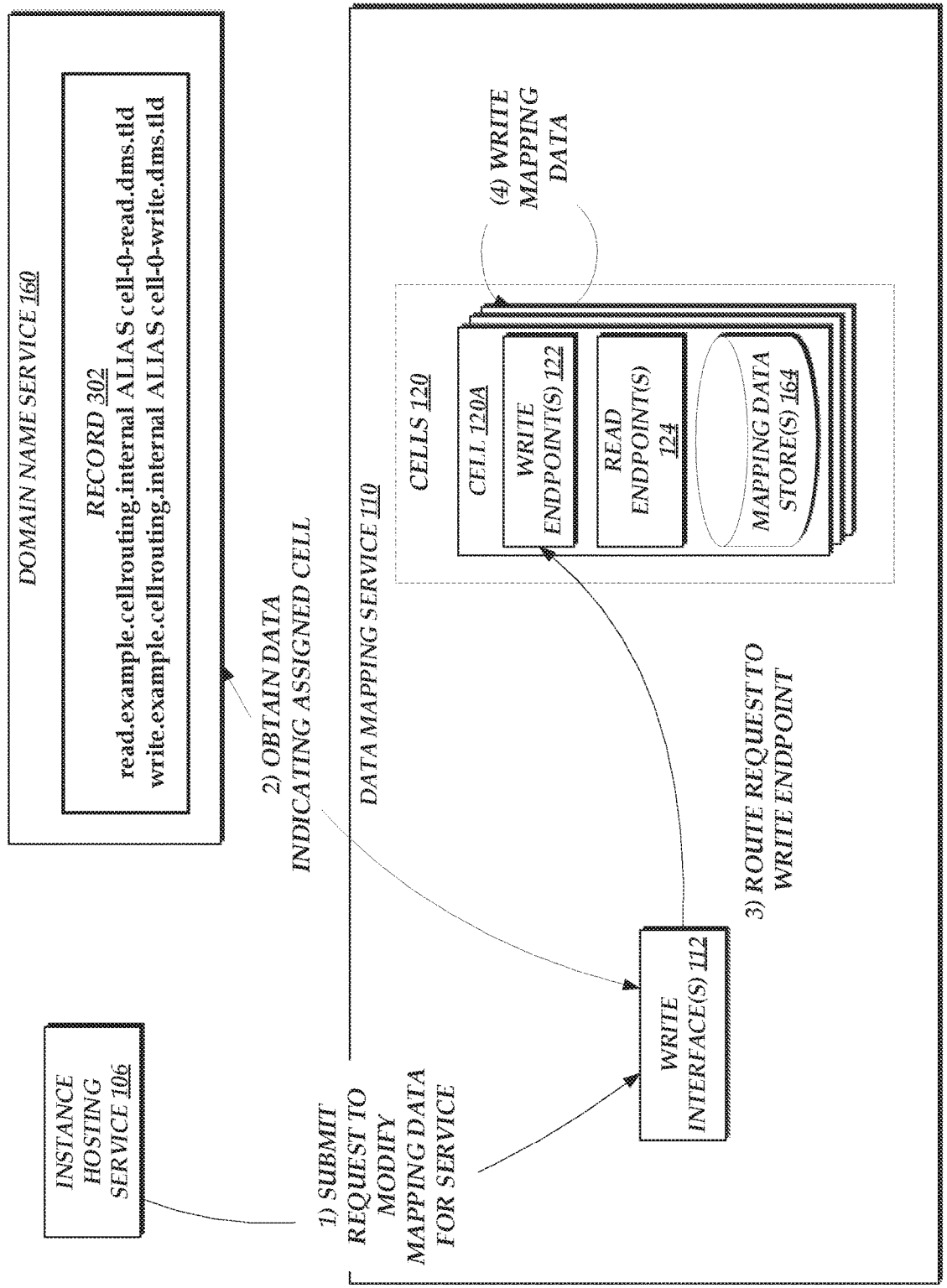
FIG. 4 is a flow diagram depicting illustrative interactions for handling a request to write data to a data set on the data mapping service of FIG. 1 that has been assigned to a cell within a cell-based architecture.
Figure 5:
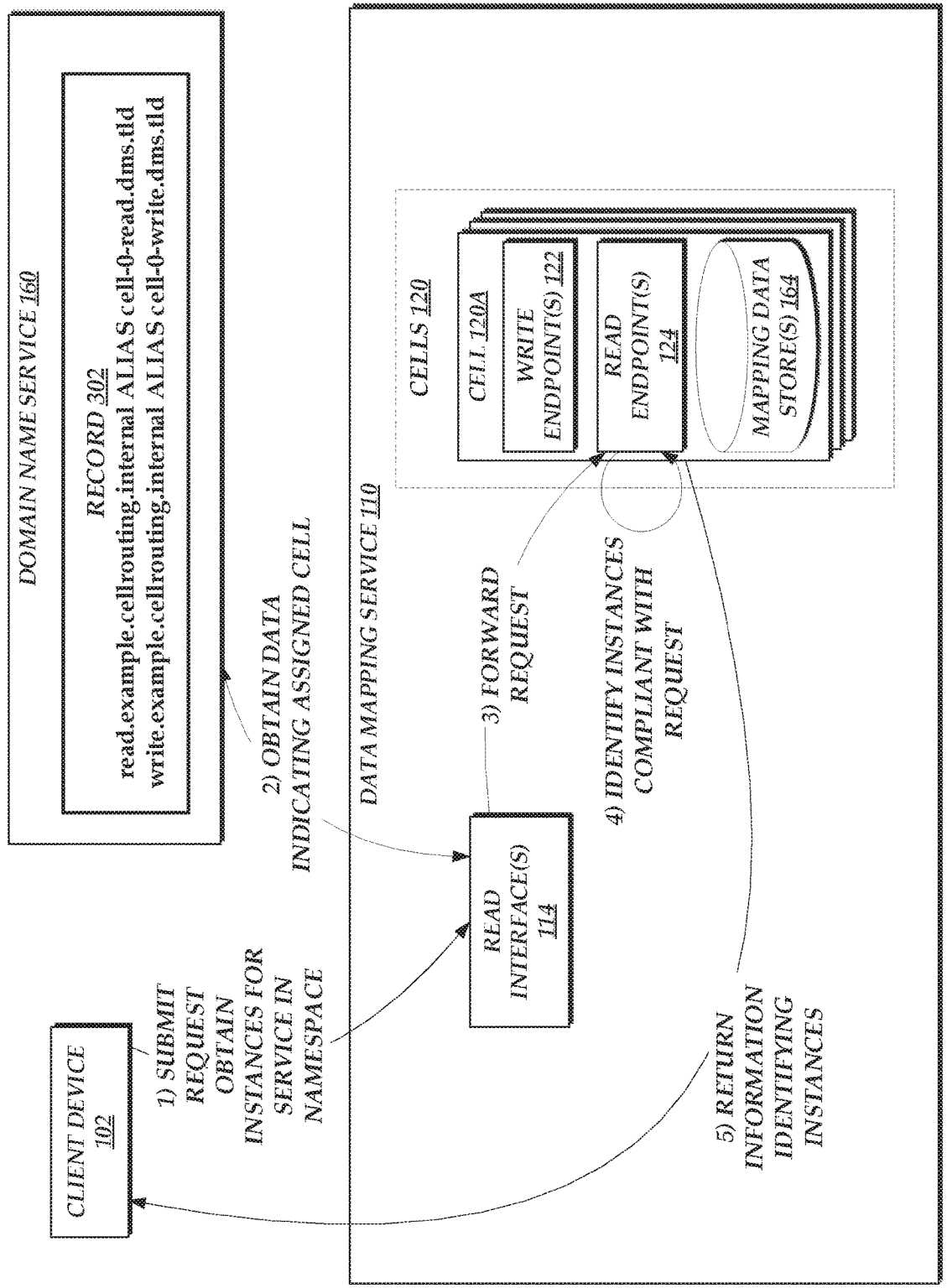
FIG. 5 is a flow diagram depicting illustrative interactions for handling a request to read data from a data set on the data mapping service of FIG. 1 that has been assigned to a cell within a cell-based architecture.

As will be described below, the records created on the domain name service 160 in FIG. 3 may thereafter be used to route requests to read from or write to mapping data on the data mapping service 110 to an appropriate cell 120. Specifically, FIG. 4 depicts illustrative interactions for writing mapping data to the service 110 for a namespace, while FIG. 5 depicts illustrative interactions for reading mapping data from the service 110 for a namespace. The interactions of FIGS. 4 and 5 may occur, for example, subsequent to creating a namespace on the service 110 (e.g., via the interactions of FIG. 3).

The interactions of FIG. 4 begin at (1), where the instance hosting service 106 submits to the write interfaces 112 a request to modifying mapping data for a service associated with a namespace (e.g., "sqlservice.example.tld"). Illustratively, an administrator of the namespace may have configured the instance hosting service 106 to interact with the data mapping service 110, such as by requesting that the service 106 generate mapping data mapping a service identifier (e.g., "sqlservice.example.tld") to identifiers of one or more instances 108 on the instance hosting service 106 providing that service. The administrator may, for example, provide the service 106 with authentication information for the namespace, which may be used by the write interfaces 112 to verify authorization of the service 106 to modify mapping data for the namespace. In one embodiment, the instance hosting service 106 is configured to programmatically write the mapping data. Thus, as the instances 108 providing the service change, the instance hosting service 106 may programmatically modify the mapping data to reflect those changes, enabling client devices 102 to access the service despite changes to the instances 108.

As noted above, the write interfaces 112 may generally be configured as proxies, routing requests from external devices (e.g., the service 106) to an appropriate endpoint within a cell 120. To that end, the interface 112, at (2), obtains from the domain name service information from the record 302 mapping a namespace identifier (e.g., "write.example.cellrouting.internal") to a cell 120 or endpoint within the cell 120 (e.g., "cell-120a-write.dms.tld," which illustratively identifies the write endpoint 122). Interaction (2) may occur, for example, via the DNS protocol, by requesting to resolve a write identifier for the namespace, which write identifier may be generated based on the request to write data.

After obtaining a response from the service 160, the write interface 112 may utilize information of the record 302 to route the write request to an appropriate write endpoint 122, such as the write endpoint 122 of cell 120A, at (3). At (4), the write endpoint 122 writes data to the mapping data store 164 as specified within the request. For example, the write endpoint 122 may modify identifiers of instances 108 providing a service in the namespace based on identifiers specified in the request by the service 106.

FIG. 5 depicts illustrative interactions for reading mapping data from the data mapping service 110. The interactions of FIG. 5 may, for example, be used by an application executing on a client device 102 in order to discovery an instance 108 providing a service utilized by the application.

The interactions of FIG. 5 begin at (1), where a client device 102 submits to the data mapping service 110 a request to obtain instances for a service within a namespace. As shown in FIG. 5, the request is routed to a read interface 114 of the service 110, which can be configured to act as a proxy for read endpoints 124 within the various cells 120 of the service 110. To that end, the interface 114, at (2), obtains from the domain name service 160 information from the record 302 mapping a namespace identifier (e.g., "read.example.cellrouting.internal") to a cell 120 or endpoint within the cell 120 (e.g., "cell-120a-read.dms.tld," which illustratively identifies the read endpoint 124). Interaction (2) may occur, for example, via the DNS protocol, by requesting to resolve a read identifier for the namespace, which read identifier may be generated based on the request to read data for a service in the namespace.

After obtaining a response from the service 160, the read interface 114 may utilize information of the record 302 to route the read request to an appropriate read endpoint 124, such as the write endpoint 124 of cell 120A, at (3).

In response to the request, the read endpoint 124 may identify, from mapping data in the mapping data stores 164 associated with the service, one or more instance identifiers compliant with the request, at (4). Illustratively, where the request does not specify any constraints for the instances, all instance identifiers mapped to the service may be identified by the read endpoint 124. Where the request specifies a constraint, one or more identifiers satisfying the constraint may be identified (or, in the instance that no instances satisfy the constraint, a message may be generated reflecting that determination). Constraints may reflect any data regarding instances stored within mapping data. For example, in addition to identifiers of instances, the hosting service 106 may write within mapping data load information for the instances 108, and a read request may specify that the n least utilized instances should be returned. As another example, the hosting service 106 may write within mapping data geographic information for the instances 108, and a read request may specify that returned instances be in a specific geographic location. As will be appreciated by one skilled in the art, any of a variety of constraints may be specified in the request, corresponding to any of a variety of information stored in the mapping data store 164 in association with instance identifiers.

At (5), after identifying instance identifiers responsive to the request, the read endpoint returns identifying information for the identified instances 108 to the client device 102. The client device 102 may thereafter communicate with one or more of the instances 108 to access the service, thus fulfilling the function of service discovery for the service.

While illustrative interactions for reading from or writing to mapping data are shown in FIGS. 4 and 5, various modifications or additions to these interactions are possible and contemplated herein. For example, while FIGS. 4 and 5 depict read interfaces 114 and write interfaces 112 obtaining addressing information for a cell endpoint from the domain name service 160, this interaction may not occur with each request to read from or write to mapping data. Rather, the service 110 may maintain cached information regarding association of a service (or namespace) identifier to addressing information for a cell endpoint. In one embodiment, an interface of the service 110 may cache the association, and transmit a request to a cell 120 identified within cached information. In the instance that the cell 120 is not assigned to store mapping data for the namespace, the cell 120 may return the request to the interface with an indicator that it is not so assigned, or may route the request to a correct cell 120. Use of caching may beneficially reduce the time required to process read/write requests for mapping data at the service 110. Thus, the interactions of FIGS. 4-5 are intended to be illustrative and not exhaustive in nature.

The use of records to associate namespace identifiers to cells may enable numerous further functionalities on the service 110. For example, because namespaces may be dynamically associated with cells 120, namespaces may be migrated among cells 120 by modification of that association (e.g., modifying a DNS record in the domain name service 160) and migration of data from a first cell 120 to a second cell 120. Illustratively, migration may occur to adjust load across cells 120—a result not provided by traditional fixed cell distribution algorithms such as hash rings. In other instances, migration may occur to provide dedicated resources to a specific namespace, such as where a namespace desires a dedicated cell 120 for mapping data related to the namespace. Thus, dynamic associations of namespaces to cells 120 provides numerous benefits over alternative techniques.

Figure 6:
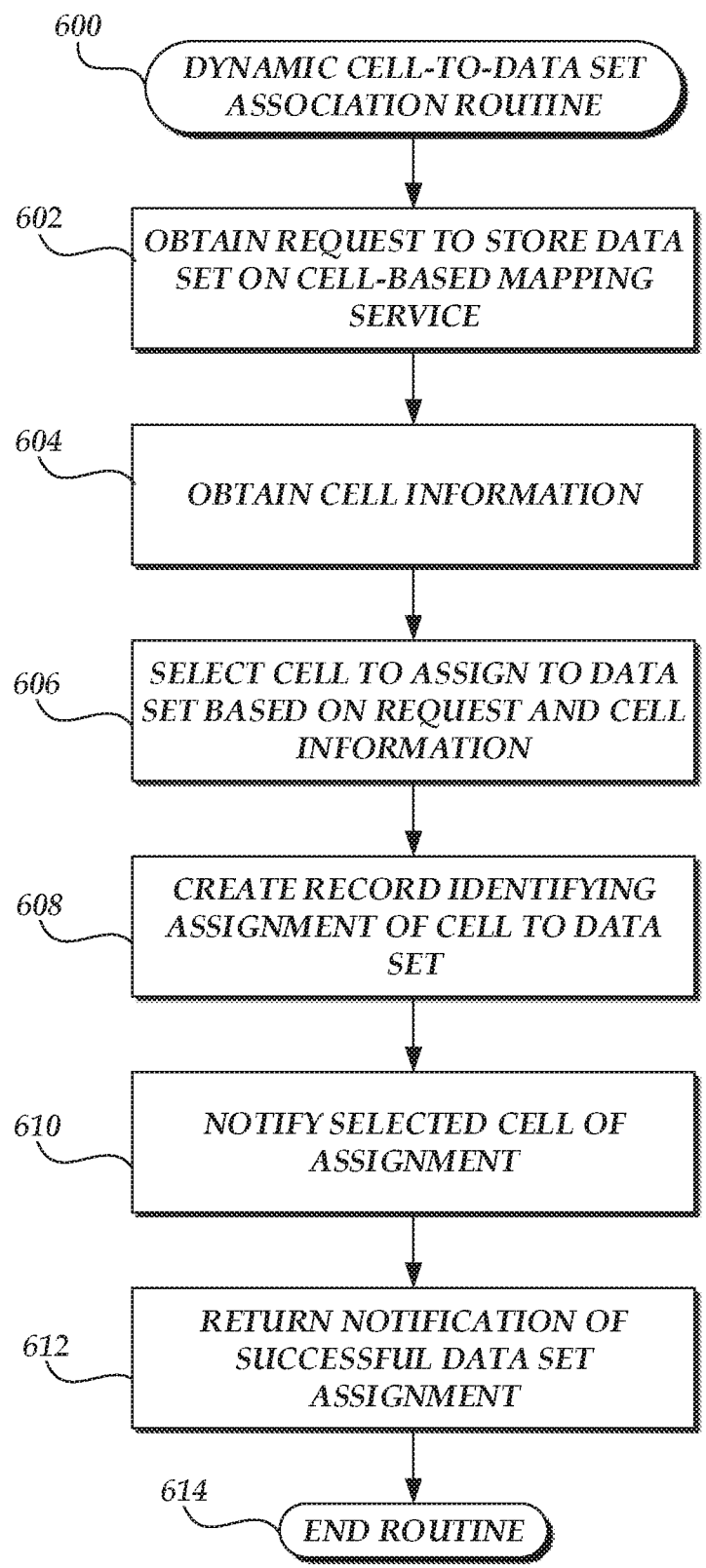
FIG. 6 is a flow chart depicting an illustrative routine for dynamically assigning a cell within a cell-based architecture to store a data set.

With reference to FIG. 6, an illustrative routine 600 is depicted to create a dynamic assignment of a cell within a cell-based architecture to a data set. The data set may correspond to any collection of data, and in one embodiment, is mapping data mapping a service identifier of a network-based service to identification or addressing information for computing devices providing the network-based service. The routine 600 is illustratively carried out by the cell assigner 118 of FIG. 1, to enable a namespace (e.g., a collection of data related to a specific subdomain) to be associated with a cell 120 hosting mapping data for the namespace.

The routine 600 begins at block 602, where cell assigner 118 obtains a request to store the data set on a cell of the cell-based architecture. The request may be, for example, a request to create a namespace on the data mapping service 110. In one embodiment, the request includes criteria for selection of a cell, such as a desired configuration of the cell (e.g., including a strongly or eventually consistent data store). The request may specify other information used by the assigner 118, such as an account identifier to which to associate the namespace (e.g., to enable namespaces to be scoped per account, as opposed to globally), authorization information for the account, and the like.

At block 604, the cell assigner 118 obtains cell information regarding cells in the cell-based architecture. The cell information may include, for example, health information for cells (e.g., whether the cell is behaving in a healthy way), load information for the cells (e.g., metrics of utilization), and configuration information for the cells (e.g., a specific way the cell stores data, hardware or software utilized by the cell, location of the cell, etc.).

At block 606, the cell assigner 118 selects a cell to assign to the data set based at least partly on the request and the cell information. Illustratively, the cell assigner 118 may first identify cells matching criteria of the request (e.g., in terms of configuration), and then select a cell matching that criteria according to a pre-defined selection algorithm. In one embodiment, the selection algorithm selects a random cell among healthy cells. In another embodiment, the selection algorithm selects a least utilized cell among healthy cells. In yet another embodiment, the selection algorithm includes a weighted comparison of multiple factors, which may include by way of non-limiting example cell health, cell utilization, and cell configuration.

At block 608, the cell assigner 118 creates a record identifying assignment of the selected cell to the data set. In one embodiment, the record may be a DNS record stored at an external DNS system, such as the domain name service 160. In another embodiment, the record is stored as mapping data within a cell of the cell-based architecture (e.g., a pre-defined cell, such as the first cell). In yet another embodiment, the record is stored in a database or other data store.

At block 610, the cell assigner 118 notifies the cell of the assignment to store the data set. Illustratively, such assignment may enable the cell to respond to requests regarding the data set (e.g., rather than rejecting the request as an unassigned cell, rerouting the request, etc.).

At block 612, the cell assigner 118 returns a notification in response to the request that the data set has been assigned to the cell. In one embodiment, block 612 may be delayed until prior blocks are confirmed as executed. For example, the cell assigner 118 may delay notification of successful cell assignment until confirming that a DNS record identifying the assignment has been sufficiently propagated at a DNS system. After transmitting the notification, the routine 600 ends at block 614.

On receiving notification of successful assignment of the data set, client devices 102 (or other computing devices) may read from and write to the data set on the cell-based architecture, by interacting with an endpoint of the assigned cell. Illustrative interactions for reading from and writing to a data set on a cell are discussed above with respect to FIGS. 4 and 5.

One skilled in the art will appreciate that the operations described above may vary across embodiments of the present disclosure. Thus, the specific operations discussed above, and the ordering of those operations, are intended to be illustrative in nature. For example, while block 608 is depicted in FIG. 6 as occurring prior to block 610, in some embodiments block 608 may occur after block 610, or the two blocks may occur concurrently. In some instances, it may be preferable that block 608 occurs prior to block 610, to increase idempotency of the routine 600 in cases of failure. For example, when implementation of block 608 occurs prior to block 610, a failure of the routine 600 between these blocks may prevent multiple cells of being notified of an assignment. Other variations in the operations above are possible.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to dynamically assign data sets to cells within a cell-based architecture, the system comprising:
    a plurality of cells forming the cell-based architecture, wherein individual cells within the plurality of cells comprise one or more computing devices configured to host data sets of client devices and make the data sets available for reading from and writing to by the client devices, and wherein the individual cells operate independently of one another within the cell-based architecture to host the data sets and make the data sets available for reading from and writing to by the client devices;
    a cell assigner implemented by one or more computing devices, the cell assigner configured with specific computer-executable instructions to:
        obtain a request to create a data set on the cell-based architecture;
        obtain cell information regarding the plurality of cells, the cell information comprising use metrics for the individual cells within the plurality of cells;
        select, based at least partly on the use metrics for the individual cells, a first cell to host the data set;
        cause a notification to be transmitted to the first cell that the first cell has been assigned to host the data set; and
        create a record indicating that requests to read from or write to the data set are to be routed to the first cell; and
    an interface implemented by the one or more computing devices, the interface configured with specific computer-executable instructions to:
        obtain a request to read from or write to the data set, wherein the request is addressed to an address of the cell-based architecture that does not identify the first cell selected to host the data set;
        identify, based at least partly on the record indicating that requests to read from or write to the data set are to be routed to the first, the first cell as hosting the data set; and
        route the request to the first cell.

2. The system of claim 1, wherein the data set comprises mapping data that associates an identifier of a service to addressing information for one or more computing devices providing the service.

3. The system of claim 2, wherein the request to read from or write to the data set is received from a hosting service hosting the one or more computing devices providing the service, and wherein the request modifies the addressing information for the one or more computing devices providing the service.

4. The system of claim 1, wherein the record associating the first cell to the data set is a domain name system (DNS) record maintained at a DNS server.

5. The system of claim 4, wherein the cell assigner is further configured with specific computer-executable instructions to:
    verify that the record associating the first cell to the data set is stored at the DNS server; and
    subsequent to verifying that the record is stored at the DNS server, transmit a notification that the data set is hosted by the cell-based architecture.

6. A computer-implemented method comprising:
- obtaining a request to create a data set on a cell-based architecture comprising a plurality of cells, wherein individual cells within the plurality of cells comprise one or more computing devices configured to host data sets and make the data sets available for reading from and writing to by client devices, and wherein the individual cells operate independently of one another within the cell-based architecture to host the data sets and make the data sets available for reading from and writing to by client devices;
- obtaining cell information regarding the plurality of cells, the cell information comprising use metrics for the individual cells within the plurality of cells;
- selecting, based at least partly on the use metrics for the individual cells, a first cell to host the data set;
- creating a record indicating that requests to read from or write to the data set are to be routed to the first cell;
- obtaining a request to read from or write to the data set, wherein the request is addressed to an address of the cell-based architecture that does not identify the first cell selected to host the data set; and
- transmitting the request to the first cell based at least partly on the record indicating that requests to read from or write to the data set are to be routed to the first cell.

7. The computer-implemented method of claim 6, wherein the record is a DNS record, and wherein transmitting the request to the first cell based at least partly on the record comprises transmitting a request to a DNS server to resolve an identifier of the data set into an identifier of the first cell.

8. The computer-implemented method of claim 7, wherein the data set includes data mapping a network-accessible service to addressing information of devices providing the service, and wherein the identifier of the data set comprises an identifier of the network-accessible service.

9. The computer-implemented method of claim 7 further comprising:
- caching an association between the identifier of the data set and the identifier of the first cell;
- obtaining a second request to read from or write to the data set; and
- transmitting the second request to the first cell based at least in part on the cached association.

10. The computer-implemented method of claim 6 further comprising:
- receiving instruction to migrate the data set from the first cell to a second cell of the plurality of cells;
- migrating the data set from the first cell to the second cell; and
- modifying the record to associate the second cell to the data set.

11. The computer-implemented method of claim 6, wherein the request to read from or write to the data set is obtained at an interface implemented externally to the individual cells.

12. The computer-implemented method of claim 6, wherein the request to read from or write to the data set is obtained at a second cell of the plurality of cells.

13. The computer-implemented method of claim 6, wherein the record is stored within a database as a key-value pair.

14. The computer-implemented method of claim 6, wherein the record is stored as a data set within the cell-based architecture.

15. A system comprising:
- a data store storing cell information regarding a plurality of cells of a cell-based architecture, wherein individual cells within the plurality of cells comprise one or more computing devices configured to host data sets and make the data sets available for modification by client devices, and wherein the individual cells operate independently of one another within the cell-based architecture to host the data sets and make the data sets available for modification by client devices; and
- one or more computing devices configured with computer-executable instructions to:
  - obtain a request to create a data set on the cell-based architecture;
  - select, based at least partly on the cell information, a first cell to host the data set;
  - create a record indicating that requests to modify the data set are to be routed to the first cell;
  - obtain a request to modify the data set, wherein the request is addressed to an address of the cell-based architecture that does not identify the first cell selected to host the data set; and
  - route the request to the first cell based at least partly on the record indicating that requests to modify the data set are to be routed to the first cell.

16. The system of claim 15, wherein the cell information comprises health information for the individual cells, and wherein the computing devices, to select the first cell, are configured to select the first cell at random from among a subset of the individual cells that are indicated as healthy within the cell information.

17. The system of claim 15, wherein the request is associated with an account of a client, wherein the cell information identifies the first cell as dedicated to data sets associated with the account, and wherein the computing devices, to select the first cell, are configured to select the first cell based at least partly on identification of the first cell as dedicated to data sets associated with the account.

18. The system of claim 15, wherein the cell information comprises usage metrics for the individual cells, and wherein the computing devices, to select the first cell, are configured to select the first cell as a least utilized cell among the plurality of cells.

19. The system of claim 15, wherein the cell information comprises configuration information for the first cell reflecting at least one of a hardware or software configuration for the first cell, and wherein the computing devices, to select the first cell, are configured to select the first cell based at least partly on the configuration information for the first cell.

20. The system of claim 19, wherein the configuration information for the first cell indicates a consistency model for first cell, wherein the request to create the data set specifies a desired consistency model, and wherein the computing devices, to select the first cell, are configured to select the first cell based at least partly on a determination that the consistency model for the first cell satisfies the desired consistency model.

* * * * *